US009709435B2

(12) United States Patent
Dockendorff et al.

(10) Patent No.: US 9,709,435 B2
(45) Date of Patent: *Jul. 18, 2017

(54) PIVOTED FLOAT LIQUID LEVEL SENSOR HAVING A MAGNETICALLY ACTUATED SWITCH

(71) Applicant: Gems Sensors, Inc., Plainville, CT (US)

(72) Inventors: James B. Dockendorff, North Haven, CT (US); Kevin B. Downs, Coventry, CT (US)

(73) Assignee: Gems Sensors Inc., Plainville, CT (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/635,249

(22) Filed: Mar. 2, 2015

(65) Prior Publication Data
US 2015/0177049 A1  Jun. 25, 2015

Related U.S. Application Data

(63) Continuation of application No. 13/399,415, filed on Feb. 17, 2012, now Pat. No. 8,966,974.

(60) Provisional application No. 61/444,504, filed on Feb. 18, 2011.

(51) Int. Cl.
G01F 23/38 (2006.01)

(52) U.S. Cl.
CPC .................................... *G01F 23/38* (2013.01)

(58) Field of Classification Search
CPC .................................................. G01F 23/38
USPC .......................................... 73/317; 200/84 C
See application file for complete search history.

(56) References Cited

U.S. PATENT DOCUMENTS

| 3,259,716 | A |   | 7/1966  | Nilssen  |             |
|-----------|---|---|---------|----------|-------------|
| 3,322,917 | A | * | 5/1967  | Furlow   | G01F 23/38  |
|           |   |   |         |          | 200/84 C    |
| 3,363,073 | A | * | 1/1968  | Bouguet  | G01F 1/00   |
|           |   |   |         |          | 200/81.9 M  |
| 3,471,665 | A |   | 10/1969 | Sargent  |             |
| 3,699,561 | A | * | 10/1972 | Putt     | B60T 17/225 |
|           |   |   |         |          | 200/84 C    |

(Continued)

FOREIGN PATENT DOCUMENTS

| EP | 0007763 | 2/1980  |
|----|---------|---------|
| GB | 172127  | 11/1969 |

(Continued)

*Primary Examiner* — Peter MacChiarolo
*Assistant Examiner* — Nathaniel Kolb
(74) *Attorney, Agent, or Firm* — Nelson Mullins Riley & Scarborough LLP

(57) ABSTRACT

A liquid level sensor for use with a container, including a housing with a body defining an interior volume, a switch actuated by an applied magnetic flux field to a closed position, the switch being disposed within the interior volume of the housing, and a float including a body, a first end and a second end opposite the first end. A pivot assembly includes a magnet and couples the housing and the first end of the float such that the float is pivotable about the pivot assembly between a first position and a second position, and a shunt is disposed within the first end of the float body. The shunt is disposed between the magnet and the switch in the first position of the float, thereby shielding the switch from the magnetic flux of the magnet such that the switch is in the open position.

11 Claims, 13 Drawing Sheets

(56) References Cited

U.S. PATENT DOCUMENTS

| | | | |
|---|---|---|---|
| 3,750,124 A | * | 7/1973 | Barnes .................. B60T 17/225 200/84 C |
| 3,934,103 A | | 1/1976 | Walstra |
| 4,107,492 A | | 8/1978 | Moon, Jr. et al. |
| 4,513,185 A | | 4/1985 | Walters |
| 6,265,980 B1 | | 7/2001 | Waller |
| 6,380,499 B1 | | 4/2002 | Edwards |
| 7,093,485 B2 | | 8/2006 | Newman et al. |
| 7,165,450 B2 | | 1/2007 | Jamnia et al. |

FOREIGN PATENT DOCUMENTS

| | | |
|---|---|---|
| GB | 1304684 | 1/1973 |
| GB | 1324027 | 7/1973 |
| GB | 2041650 | 9/1980 |

\* cited by examiner

PIVOTED FLOAT LIQUID LEVEL SENSOR HAVING A MAGNETICALLY ACTUATED SWITCH

CLAIM OF PRIORITY

This application is a continuation of U.S. patent application Ser. No. 13/399,415, filed Feb. 17, 2012, now U.S. Pat. No. 8,966,974, which claims priority to U.S. Provisional Patent Application No. 61/444,504, filed Feb. 18, 2011, the entire disclosures of which are incorporated by reference herein.

FIELD OF THE INVENTION

The present invention relates generally to a liquid level sensor. More particularly, the present invention relates to a liquid level sensor having a magnetically actuated switch.

BACKGROUND

Liquid level sensors utilizing magnetically activated switches to indicate high and/or low level conditions are known. Existing liquid level sensors typically include a stationary switch, often a reed switch, and a magnet which is movable relative to the switch such that the magnetic field it produces selectively influences the switch. For example, a reed switch includes two stems, or reeds, within an enclosure. The reeds are constructed of a ferrous material so that they are influenced, or move, in the presence of a magnetic field. More specifically, when no magnetic field is present, the mechanical stiffness of the reeds moves them out of contact with each other, thus opening the associated circuit. In the presence of a strong enough magnetic field, the reeds move toward each other until contact is made, thus completing the circuit. As noted above, existing liquid level sensors typically include a magnet which is movable relative to the reed switch. This is often accomplished by placing the magnet on a float, or other device, that moves relative to the switch as the level of the fluid being observed changes. It is known for various existing level sensors to provide erratic level indications because as the magnet moves, the position and strength of the associated flux field can be difficult to determine. As such, the effect of the magnetic field on the associated sensor can be similarly hard to predict, i.e., what exact position of the float relative to the switch will cause the switch to open and/or close.

The present invention recognizes and addresses certain or all the foregoing considerations, and others, of prior art constructions.

SUMMARY

One embodiment of the present disclosure provides a liquid level sensor for use with a container, including a housing with a body defining an interior volume, a switch actuated to a closed position by an applied magnetic flux field, the switch being disposed within the interior volume of the housing, and a float including a body, a first end and a second end opposite the first end. A pivot assembly includes a magnet and couples the housing and the first end of the float such that the float is pivotable about the pivot assembly between a first position and a second position, and a shunt is disposed within the first end of the float body. The shunt is disposed between the magnet and the switch in the first position of the float, thereby shielding the switch from the magnetic flux of the magnet such that the switch is in an open position.

Another embodiment of the present disclosure provides a liquid level sensor for use with a container, including a housing with a body defining an interior volume, a switch actuated to a closed position by an applied magnetic flux field, the switch being disposed within the interior volume of the housing, and a float including a body, a first end and a second end opposite the first end. A pivot assembly includes a magnet and couples the housing and the first end of the float such that the float is pivotable about the pivot assembly between a first position and a second position, and a shunt is disposed within the pivot assembly. The shunt is disposed between the magnet and the switch in the first position of the float, thereby shielding the switch from the magnetic flux field of the magnet such that the switch is in an open position.

Another embodiment of the present disclosure provides a liquid level sensor for use with a container, including a housing with a body defining an interior volume, a switch actuated to an open position by an applied magnetic flux field, the switch being disposed within the interior volume of the housing, and a float including a body, a first end and a second end opposite the first end. A pivot assembly includes a cylindrically-shaped magnet having a longitudinal center axis that is parallel to the pivot axis, and couples the housing and the first end of the float such that the float is pivotable about the pivot assembly about a pivot axis between a first position and a second position, and a shunt is disposed within the first end of the float body. The shunt is disposed between the magnet and the switch in the first position of the float, thereby shielding the switch from the magnetic flux field of the magnet such that the switch is in a closed position.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

A full and enabling disclosure of the present invention, including the best mode thereof, directed to one of ordinary skill in the art, is set forth in the specification, which makes reference to appended drawings, in which.

Figure 1:
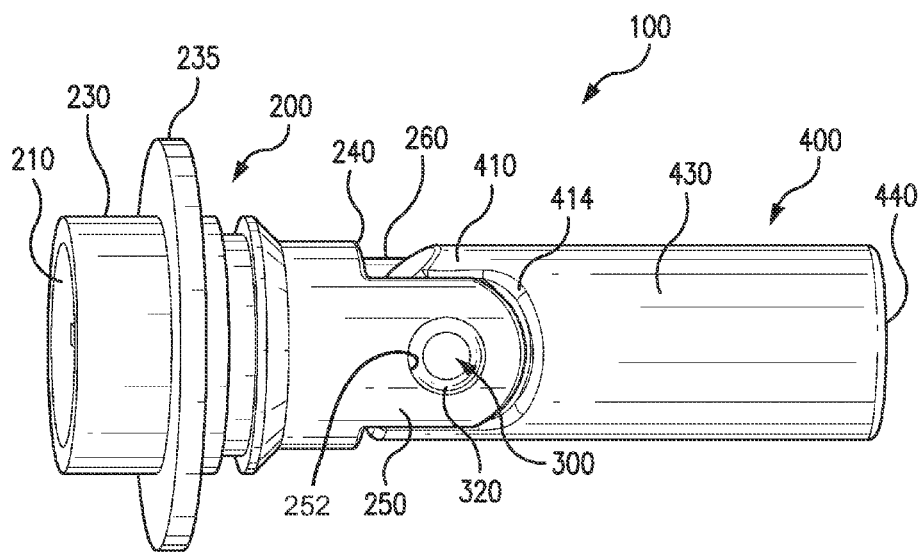
FIG. 1 is a perspective view of a liquid level sensor in a low-level position according to an embodiment of the present disclosure.

Repeat use of reference characters in the present specification and drawings is intended to represent same or analogous figures or elements of the invention.

DETAILED DESCRIPTION

Reference will now be made in detail to presently preferred embodiments of the disclosure, one or more examples of which are illustrated in the accompanying drawings. Each example is provided by way of explanation, not limitation, of the disclosure. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Referring now to FIG. 1, an exemplary embodiment of a liquid level sensor 100 in accordance with the present disclosure is shown. Liquid level sensor 100 may be used to detect or indicate a predetermined fluid level in a variety of applications, such as for example, coolant level in a radiator. In the exemplary embodiment shown in FIG. 1, liquid level sensor 100 is in a low-level position, i.e., when the level of fluid is below a predetermined level.

Liquid level sensor 100 includes a housing 200 and a float 400 pivotally coupled with housing 100. As will be described in further detail below, the float 400 rotates about pivot assembly 300. Housing 200 includes an open end 210 and a closed end 240 opposite open end 210. A body 230 extends between and joins open end 210 and closed end 240. As shown, body 230 is substantially cylindrical and is formed of a plastic. Other suitable shapes, i.e. square, rectangular, oval, etc. can be used for the body of housing 200. As well, other suitable materials i.e., alloys, fiber-reinforced plastics, polymers, can be used in the construction of the housing.

In one embodiment, open end 210 is configured to be coupled to a mating connector for interfacing with various other components. In another embodiment, open end 210 may be connected directly with electrical leads, in which case open end 210 may itself be referred to as a flying lead connector. Open end 210 can be disposed in electrical communication with a processor or other electronic circuitry (not shown), such as, for example, an indicator or alarm circuit that provides visual and/or audible indication regarding the fluid level.

Coupled with and circumscribing body 230 between open end 210 and closed end 240 is a flange 235. Flange 235 facilitates connection or interface of first end 210 of housing 200 with an opening of a tank (not shown) or other container. In an alternate embodiment, body 230 of housing 200 may include an external thread that allows housing to be threaded directly into a correspondingly threaded aperture of a tank, in which case flange 235 may not be necessary.

Extending from closed end 240 is a first leg 250 and a second leg 260 disposed in facing opposition to first leg 250. An orifice 252 is formed in first and second legs 250 and 260 transverse to the longitudinal axis of housing 200. A diameter of orifice 252 is sufficient to allow the pivot assembly 300 to pass through the first leg 250 while maintaining a snug fit around pivot assembly 300. Pivot assembly 300 is secured to first leg 250 and second leg 260 by a snap-fit construction. Other suitable means can be used to secure or retain pivot assembly 300, such as one end of pivot assembly 300 can be externally threaded and received in a correspondingly threaded orifice in either first leg 250 or second leg 260.

Referring again to FIG. 1, float 400 is pivotally coupled with housing 200. Float 400 is substantially cylindrical and includes a first end 410 and a second end 440 disposed opposite the first end 410. As shown, second end 440 is closed and is a substantially planar surface. In another embodiment, second end 440 can be hemispherical. A body 430 extends between and joins first end 410 and second end 440. As shown, body 430 is substantially cylindrical and is formed of plastic. Other suitable materials, such as alloys, ceramics and epoxy-based materials, can be used in the construction of the float. Float 400 is constructed such that it reacts to a rising or falling fluid level, i.e., the float is generally buoyant. An interior portion of float 400 may be substantially hollow or substantially or partially filled with a foaming agent or other suitable material.

First end 410 of float 440 includes a first socket 412 (best seen in FIG. 3) and a first shoulder 414. Although not shown, a second socket and a second shoulder are formed on an opposing side of the first end 410 of float 400 similar to socket 412 and shoulder 414. First socket 412 and second socket of first end 410 of float 400 slidably engage between the distal ends of first leg 250 and second leg 260 of housing 200. First leg 250 and second leg 260 of housing 200 respectively engage, or confront, the first shoulder 414 and the second shoulder of float 400. First end 410 of float 400 includes an orifice 418 to permit pivot assembly 300 to pass through. Float 400 is configured to rotate about pivot assembly 300 and change attitude within a predetermined range of motion.

Figure 2:
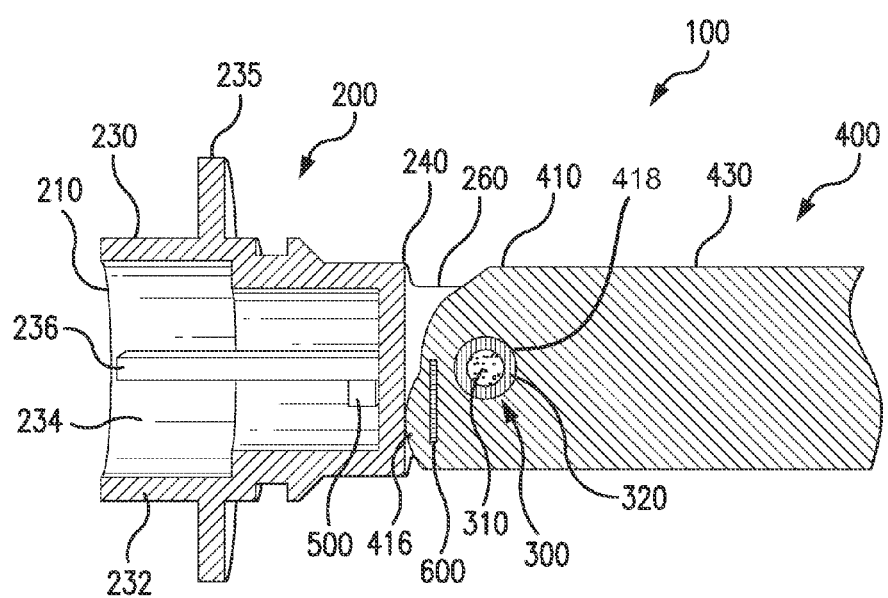
FIG. 2 is a sectional view along a longitudinal axis of the liquid level sensor shown in FIG. 1.

Referring now to FIG. 2, a cross-sectional view along the longitudinal axis of liquid level sensor 100 of FIG. 1 is shown. Body 230 of housing 200 is hollow and an interior volume 234 of housing 200 is defined by body walls 232. A printed circuit board (referred to hereinafter as "PCB") 236 is disposed in interior volume 234 of housing 200 and is coupled with body walls 232 with a slot (not shown) formed in housing 200.

A reed switch 500 is disposed in interior volume 234 of housing 200 and is coupled with PCB 236. Reed switch 500 can be soldered to PCB 236. Reed switch 500 is disposed in electrical communication with PCB 236. Other suitable methods of coupling the reed switch 500 to PCB 236 can be used. Reed switches are known in the art, and one exemplary embodiment is described in U.S. Pat. No. 2,264,746, issued Dec. 2, 1941 to Ellwood, the disclosure of which is incorporated in its entirety herein by reference. A reed switch is an electrical switch operated by an applied magnetic field. In general, a reed switch has two flexible, metal reeds, or stems, inside an enclosure (typically, a hermetically sealed enclosure). The reeds are ferrous, and thus, move in the presence of a magnetic field. For the presently discussed embodiment of level sensor 100, when no magnetic field is present, the mechanical stiffness of the reeds separates the two reeds out of contact with each other, thus, opening the switch and disconnecting the electrical circuit in which the reed switch is installed. In the presence of a magnetic field, the reeds move together, thus closing the circuit. In alternate embodiments, the contacts may be normally closed, opening when a magnetic field is present. Reed switch 500 is disposed in electrical communication with a processor or other electronic circuitry (not shown), such as for example, an indicator or alarm circuit.

Still referring to FIG. 2, pivot assembly 300 includes a magnet 310. The magnet 310 is a permanent magnet formed of neodymium. Other suitable magnets or magnetic materials can be used. Magnet 310 is cylindrical and fully encapsulated by a magnet carrier 320, or body, of pivot assembly 300. Magnet carrier 320 is preferably formed of a plastic material, but other suitable materials can be used. In one embodiment, magnet 310 is dimensioned such that it does not extend beyond the width of first end 410 of float 400.

Disposed between magnet 310 and reed switch 500 is a shunt 600. Shunt 600 is fully encased and supported by first end 410 of float 400. In one embodiment, shunt 600 is dimensioned such that it does not extend beyond the width of first end 410 of float 400. As shown, the thickness of shunt 600 is approximately 0.010 inches, but may vary dependent upon a number of factors, such as, but not limited to, magnet strength, specifications of the reed switch, dimensions between the reed switch, the magnet and the shunt, etc. Shunt 600 provides magnetic shielding, i.e. shunt 600 is made of a material that conducts magnetic flux better than the materials around it. In the present embodiment, shunt 600 is made of a nickel-iron alloy, such as, for example, Glass Sealing Alloy 52 available from Carpenter Technology Corporation in Wyomissing, Pa. However, other suitable materials for shunt 600 can be used.

Figure 5:
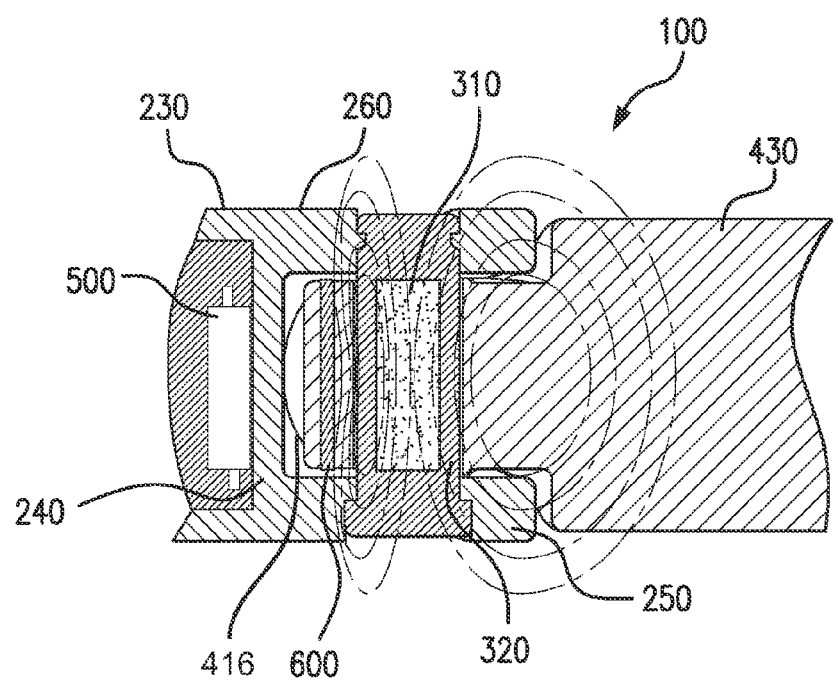
FIG. 5 is a sectional view orthogonal to the longitudinal axis of the liquid level sensor shown in FIGS. 1 and 2.

As shown in FIG. 5, the magnetic flux of magnet 310 tends to flow along a length of shunt 600. In such a configuration, shunt 600 deflects the magnetic flux, thus shielding reed switch 500 from the magnetic flux of the magnet 310. Referring again to FIG. 2, shunt 600 is interposed between magnet 310 and reed switch 500 when float 400 is in the low-level position. As noted above, in the absence of a magnetic field, the reeds (not shown) in reed switch 500 separate causing the circuit to open, which in turn, triggers an alarm indicating a low fluid level.

For the present embodiment of level sensor 100, shunt 600 is positioned and dimensioned such that it shields or deflects the magnetic flux of magnet 310 from reed switch 500 when float 400 is in the low level position. As well, for the present embodiment, a center-line to center-line distance between reed switch 500 and shunt 600 is approximately 0.375 inches and a center-line to center-line distance between shunt 600 and magnet 310 is approximately 0.125 inches. Thus, a center-line to center-line distance between reed switch 500 and magnet 310 of this embodiment is approximately 0.500 inches. Other suitable dimensions between reed switch 500, shunt 600, and magnet 310 can be used, dependent upon various factors such as magnet strength, specifications of the reed switch, size of the shunt, etc.

Figure 3:
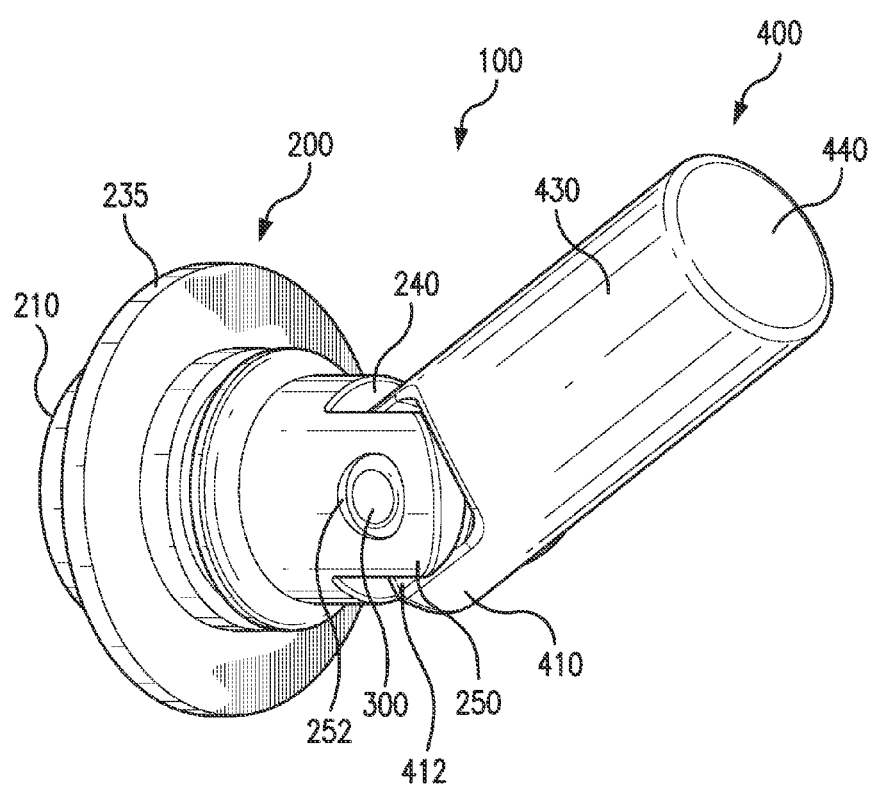
FIG. 3 is a perspective view of the liquid level sensor of FIG. 1 in a full position.

Referring now to FIG. 3, a perspective view of liquid level sensor 100 in a full position, i.e., when the level of fluid is at or above a predetermined level, is shown. The buoyancy of float 400 within the rising fluid (not shown) causes first end 410 of float 400 to rotate about pivot assembly 300, changing the attitude of float 400 from that shown in the low-level position to that shown in the full position. In the full position, body 430 of float 400 is oblique, or inclined, with respect to the longitudinal axis of housing 200. Float 400 is constrained from lateral movement by first leg 250 and second leg 260 of housing 200.

Note that in the absence of fluid exerting upward force against body 430 of float 400, the weight of body 430 will cause float 400 to move to the low-level position, or axially aligned with the longitudinal axis of housing 200. Referring again to FIG. 2 (and as also seen in FIG. 5), first end 410 of float 400 includes a boss 416 that protrudes from first end 410 such that when float 400 and housing 200 are axially aligned, boss 416 and closed end 240 are in confronting engagement. Thus, boss 416 prevents rotation of float 400 downwardly beyond the low-level position. As such, shunt 600 will maintain reed switch 500 in the proper position until the low-level condition is cured. Additionally, when float 400 is in the low-level position, shunt 600 counterbalances the weight of float 400.

Figure 4:
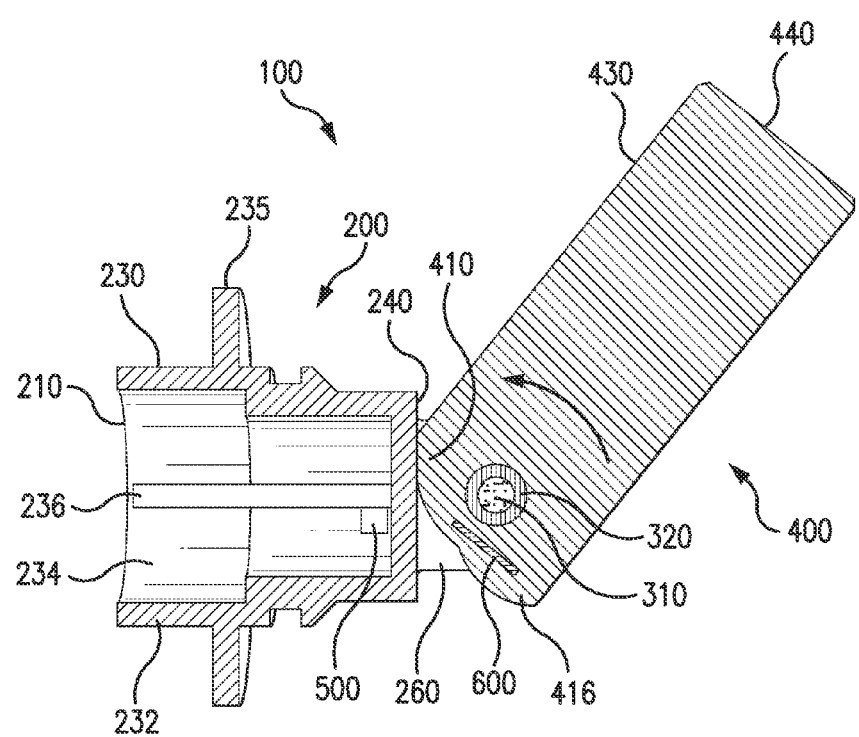
FIG. 4 is a sectional view along a longitudinal axis of the liquid level sensor shown in FIG. 3.
Figure 6:
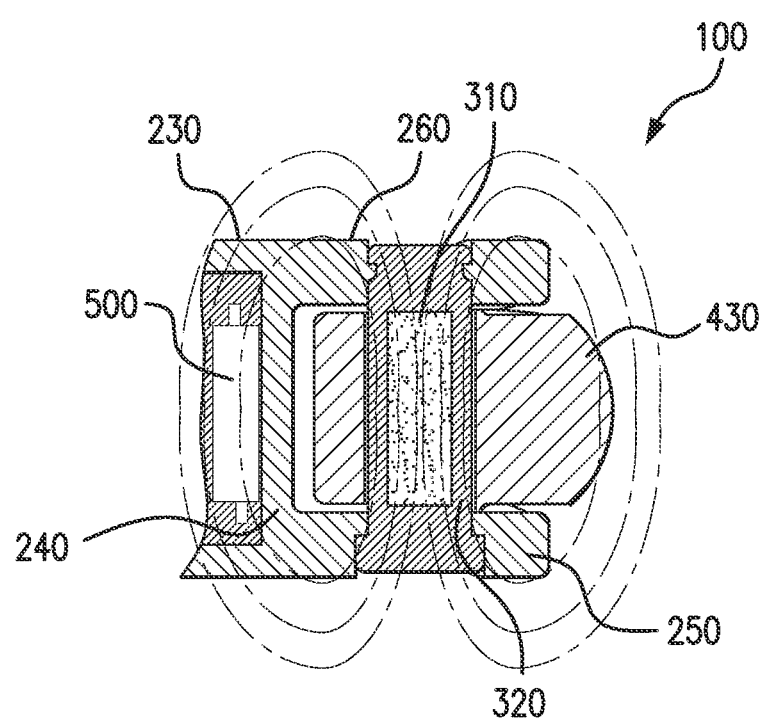
FIG. 6 is a sectional view orthogonal to the longitudinal axis of the liquid level sensor in a position similar to that shown in FIGS. 3 and 4.

Referring now to FIG. 4, a cross-sectional view along the longitudinal axis of housing 200 is shown. As described above, first end 410 of float 400 rotates about pivot assembly 300. Second end 440 is inclined with respect to housing 200 in this position. With first end 410 of float 400 positioned beneath a plane formed by the longitudinal axis of housing 200, shunt 600 no longer shields or deflects the magnetic flux of magnet 310 from reed switch 500. As magnet 310 is part of the pivot assembly 300 rather than being integrally formed with float 400, shunt 600 rotates about pivot assembly 300 and thus, magnet 310. As shown in FIG. 6, magnetic flux of magnet 310 is in communication or aligned directly with reed switch 500 when shunt 600 is no longer interposed between magnet 310 and reed switch 500, e.g. in the full position of float 400. In the presence of the magnetic flux from magnet 310, the reeds in reed switch 500 move together, thus closing the circuit.

Figure 7:
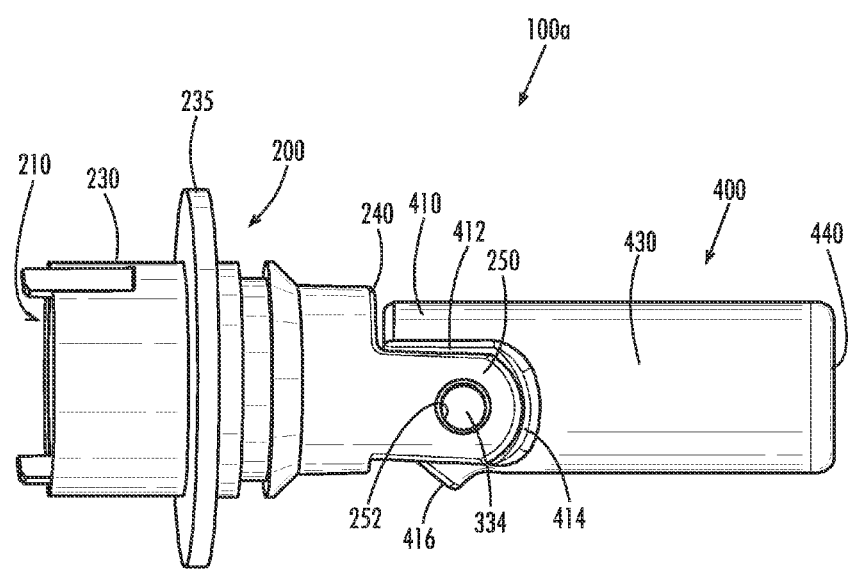
FIG. 7 is a perspective view of an alternate embodiment of liquid level sensor in a full position according to an embodiment of the present disclosure.
Figure 8:
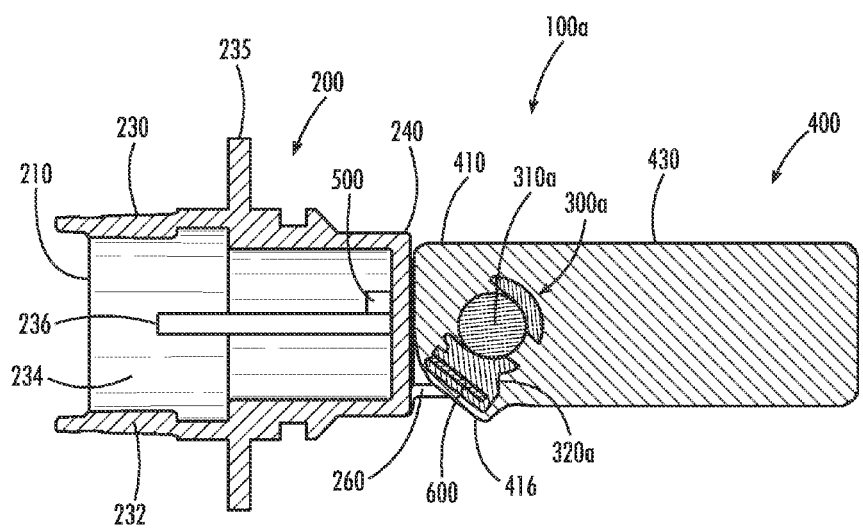
FIG. 8 is a sectional view along a longitudinal axis of the level sensor shown in FIG. 7.

Referring now to FIGS. 7 and 8, an exemplary alternate embodiment of a liquid level sensor 100a in accordance with the present disclosure is shown. Liquid level sensor 100a may be used to detect or indicate a predetermined fluid level in a variety of applications, such as for example, coolant level in a radiator. As shown in FIGS. 7 and 8, liquid level sensor 100a is in a full position, i.e., when the level of fluid is at or above a predetermined level.

Liquid level sensor 110a is constructed similarly to liquid level sensor 100, discussed above with regard to FIGS. 1 through 6. As such, only those portions of liquid level sensor 110a that differ have been given different reference numbers. Liquid level sensor 100a includes a housing 200 and a float 400 pivotally coupled thereto by a pivot assembly 300a. Housing 200 includes an open end 210 and a closed end 240 opposite open end 210. A body 230 extends between and joins open end 210 and closed end 240. As shown, body 230 is substantially cylindrical and is formed of a plastic. Other suitable shapes, i.e. square, rectangular, oval, etc. can be used for the body of housing 200. As well, other suitable materials i.e., alloys, fiber-reinforced plastics, polymers, can be used in the construction of the housing.

In one embodiment, open end 210 is configured to be coupled to a mating connector interfacing with other components, such as, for example a relay. In another embodiment, open end 210 may be connected directly with electrical leads, in which case open end 210 may itself be referred to as a flying lead connector. Open end 210 can be disposed in electrical communication with a processor or other electronic circuitry (not shown), such as, for example, an indicator or alarm circuit that provides visual and/or audible indication regarding the fluid level.

Coupled with and circumscribing body 230 between open end 210 and closed end 240 is a flange 235. Flange 235 facilitates connection or interface of first end 210 of housing 200 with an opening of a tank (not shown) or other container. In an alternate embodiment, body 230 of housing 200 may include an external thread that allows housing to be threaded directly into a correspondingly threaded aperture of a tank, in which case flange 235 may not be necessary.

Figure 13:
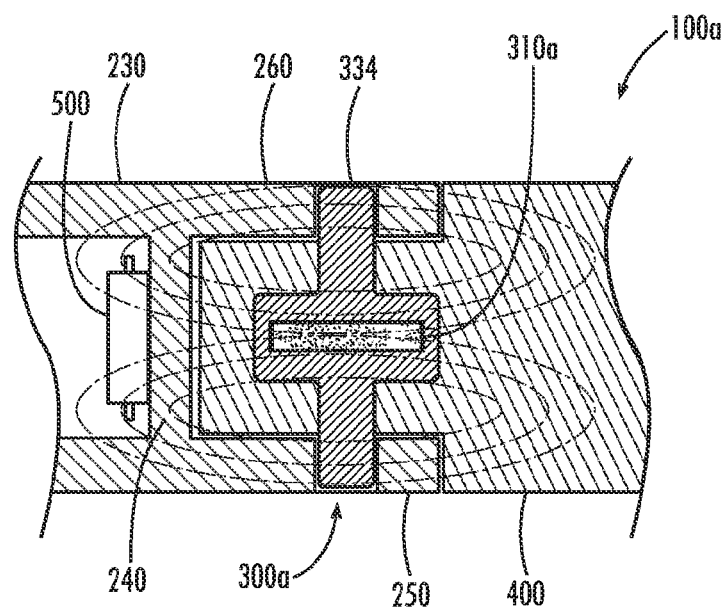
FIG. 13 is a sectional view orthogonal to the longitudinal axis of the liquid level sensor shown in FIGS. 7 and 8.

Extending from closed end 240 is a first leg 250 and a second leg 260 disposed in facing opposition to first leg 250. An orifice 252 is formed in first and second legs 250 and 260 transverse to the longitudinal axis of housing 200. A diameter of orifice 252 is sufficient to rotatably receive a corresponding pivot arm 334 (best seen in FIGS. 13 and 14) of pivot assembly 300 such that first end 410 of float is securely attached to first and second legs 250 and 260, yet float 400 is readily pivotable relative to housing 200. Pivot assembly 300a is rotatably secured between first leg 250 and second leg 260 by a snap-fit construction.

Figure 11:
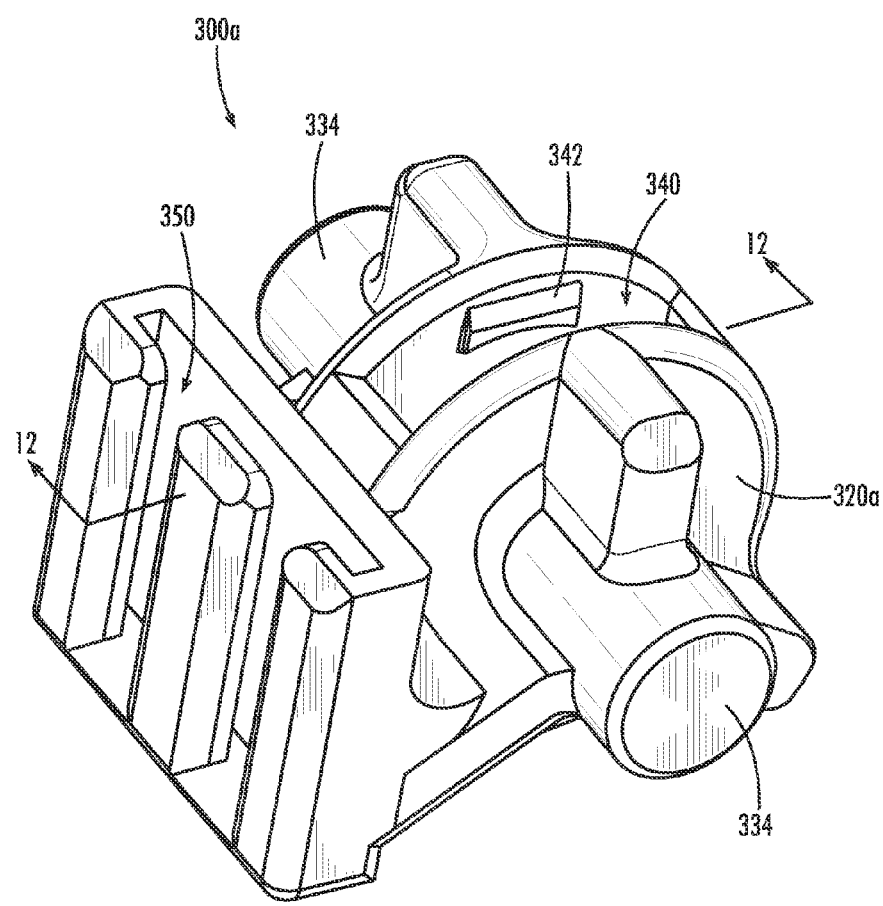
FIG. 11 is a perspective view of a pivot assembly of the liquid level sensor shown in FIG. 7.
Figure 12:
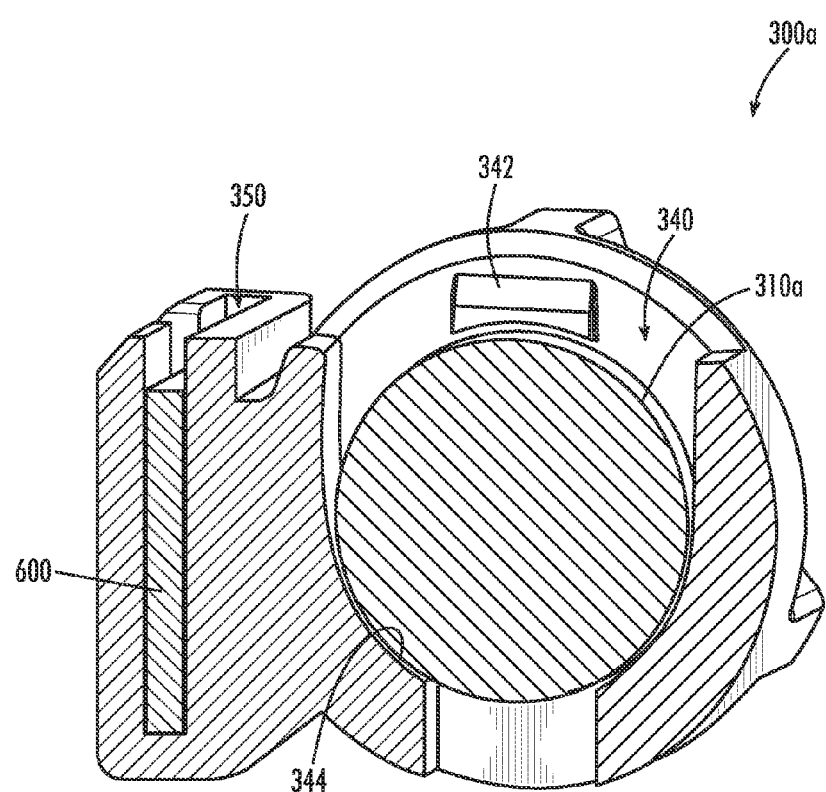
FIG. 12 is a sectional view along line 12-12 of the pivot assembly shown in FIG. 11.

Referring now to FIGS. 11 and 12, pivot assembly 300a of the present embodiment includes a body 320a (or carrier portion), a pair of pivot arms 334, and defines a first and a second slot 340 and 350, respectively. The pair of pivot arms 334 depend outwardly from opposing sides of body 320a and define the pivot axis about which float 400 pivots relative to housing 200. Each pivot arm 334 is substantially cylindrical and, as discussed above, is configured to be rotatably received by corresponding orifices 252 of first and second legs 250 and 260 such that the pivot axis of float 400 is transverse to the longitudinal center axis of housing 200. As shown, pivot assembly 300a is preferably formed of plastic although other suitable materials, such as nylon, can be used in alternate embodiments.

As shown, first slot 340 of pivot assembly 300a is configured to slidably receive a disk-shaped magnet 310a such that magnet 310a, and therefore its magnetic flux field, is concentric about the pivot axis defined by pivot arms 334. As such, first slot 340 terminates at a semi-cylindrical end wall 344. A pair of opposed resilient tabs 342 are disposed on opposed sidewalls of first slot 340 adjacent its entrance opening to retain magnet 310a within the slot. Preferably, magnet 310a is a permanent magnet formed of neodymium. As noted, magnet 310a is preferably a disk-shaped cylindrical magnet, however, other suitable shapes and magnetic materials can be used in alternate embodiments.

Figure 14:
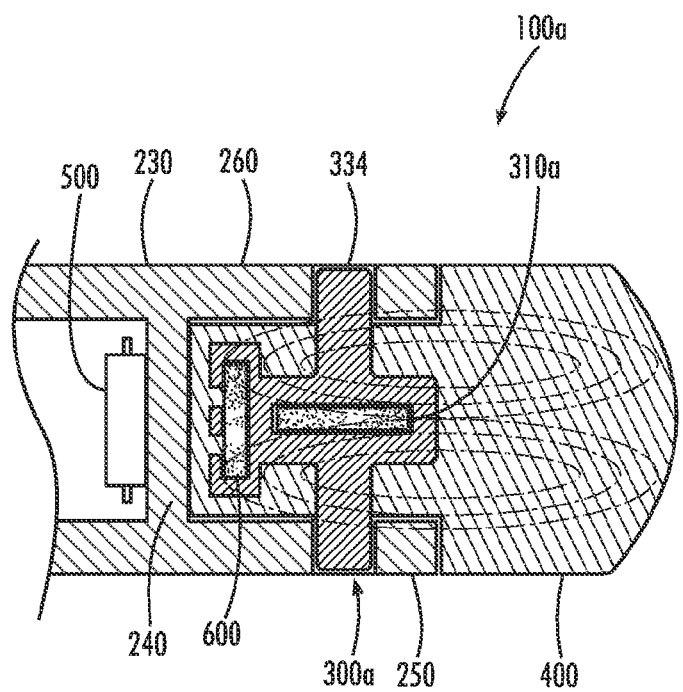
FIG. 14 is a sectional view orthogonal to the longitudinal axis of the liquid level sensor in a position similar to that shown in FIGS. 9 and 10.

Second slot 350 of pivot assembly 300a is configured to slidably receive a shunt 600 such that it is selectively positionable between magnet 310a and reed switch 500 as float 400 pivots relative to housing 200, as discussed in greater detail below. As shown, shunt 600 is preferably rectangular in cross-section and the thickness of shunt 600 is approximately 0.010 inches, but may vary dependent upon a number of factors, such as, but not limited to, magnet strength, specifications of the reed switch, dimensions between the reed switch, the magnet and the shunt, etc. Shunt 600 provides magnetic shielding, i.e., shunt 600 is made of a material that conducts magnetic flux better than the materials around it. As such, as best seen in FIG. 14, shunt 600 disrupts the uniformity of the magnetic flux field of magnet 600. More specifically, shunt 600 creates a region in which the lobes of the magnetic flux field are shortened as compared to the lobes of the remainder of the field. Because the position of shunt 600 is fixed relative to magnet 310a, as pivot assembly 300a is rotated relative to reed switch 500, the region of shortened lobes is similarly rotated. As discussed in greater detail below, this non-uniform magnetic flux field is used to alternately close reed switch 500, when the longer lobes are adjacent the switch, or open reed switch 500, when the region of the shorter lobes is adjacent the switch. In the present embodiment, shunt 600 is made of a nickel-iron alloy, such as, for example, Glass Sealing Alloy 52 available from Carpenter Technology Corporation in Wyomissing, Pa. However, other suitable materials for shunt 600 can be used.

Referring again to FIG. 7, float 400 is substantially cylindrical and includes a first end 410 and a second end 440 disposed opposite the first end 410. As shown, second end 440 is closed and is a substantially planar surface. In another embodiment, second end 440 can be hemispherical. A body 430 extends between and joins first end 410 and second end 440. As shown, body 430 is substantially cylindrical and is formed of plastic. Other suitable materials, such as alloys, ceramics and epoxy-based materials, can be used in the construction of the float. As best seen in FIG. 8, float 400 is preferably constructed such that pivot assembly 300a, along with the corresponding magnet 310a and shunt 600, is co-molded into first end 410 of float 400 with pivot arms 334 depending outwardly therefrom. Float 400 is constructed such that it reacts to a rising or falling fluid level, i.e., the float is generally buoyant. An interior portion of float 400 may be substantially hollow or substantially or partially filled with a foaming agent or other suitable material.

First end 410 of float 440 further includes a first socket 412 (best seen in FIG. 9) and a first shoulder 414. Although not shown, a second socket and a second shoulder are formed on an opposing side of the first end 410 of float 400 similar to socket 412 and shoulder 414. First socket 412 and second socket of first end 410 of float 400 slidably engage between the distal ends of first leg 250 and second leg 260 of housing 200. First leg 250 and second leg 260 of housing 200 respectively engage, or confront, first shoulder 414 and the second shoulder of float 400. As first end 410 of float 400 is slidably positioned between first leg 250 and second leg 260 of housing 200, pivot arms 334 cause the distal ends of first and second legs 250 and 260 to flex slightly outwardly until pivot arms 334 are received within respective orifices 252 defined by first and second legs 250 and 260. Once received, the distal ends of first and second legs 250 and 260 return to their unbiased, at rest positions such that first end 410 of float 400 is retained therebetween. Float 400 is configured to rotate with pivot assembly 300a and change attitude within a predetermined range of motion.

Referring now to FIG. 8, a cross-sectional view along the longitudinal axis of liquid level sensor 100a of FIG. 7 is shown. Body 230 of housing 200 is hollow and an interior volume 234 of housing 200 is defined by body walls 232. A printed circuit board (referred to hereinafter as "PCB") 236 is disposed in interior volume 234 of housing 200 and is coupled with body walls 232 with a slot (not shown) formed in housing 200.

A reed switch 500 is disposed in interior volume 234 of housing 200 and is coupled with PCB 236. Reed switch 500 can be soldered to PCB 236. Reed switch 500 is disposed in electrical communication with PCB 236. Other suitable methods of coupling the reed switch 500 to PCB 236 can be used. As discussed previously, a reed switch has two flexible, metal reeds, or stems, inside an enclosure (typically, a hermetically sealed enclosure). The reeds are ferrous, and thus, move in the presence of a magnetic field. For the presently discussed embodiment of level sensor 100a, when no magnetic field is present, the mechanical stiffness of the reeds separates the two reeds out of contact with each other, thus, opening the switch and disconnecting the electrical circuit in which the reed switch is installed. In the presence of a magnetic field, the reeds move together, thus closing the circuit. In alternate embodiments, the contacts may be normally closed, opening when a magnetic field is present. Reed switch 500 is disposed in electrical communication with a processor or other electronic circuitry (not shown), such as, for example, an indicator or alarm circuit.

As shown in FIG. 14, the magnetic flux of magnet 310a tends to flow along a length of shunt 600. In such a configuration, shunt 600 deflects the magnetic flux, thus shielding reed switch 500 from the magnetic flux of the magnet 310a. For the present embodiment, this occurs when float 400 is in the low-level position with respect to housing 200. In contrast, referring again to FIG. 8, and additionally to FIG. 13, shunt 600 is not interposed between magnet 310a and reed switch 500 when float 400 is in a full-level position. In the full position, the buoyancy of float 400 within the fluid (not shown) causes first end 410 of float 400 to rotate with pivot assembly 300a, changing the attitude of float 400 from that shown in the low-level position (FIGS. 9 and 10) to that shown in the full position. In the full position, body 430 of float 400 is axially aligned with respect to the longitudinal axis of housing 200. As such, magnetic flux of magnet 310a is in communication or aligned directly with reed switch 500 when shunt 600 is not interposed between magnet 310a and reed switch 500, e.g., in the full position of float 400. In the presence of the magnetic flux from magnet 310, the reeds in reed switch 500 move together, thus closing the circuit. Float 400 is constrained from lateral movement by first leg 250 and second leg 260 of housing 200.

Figure 9:
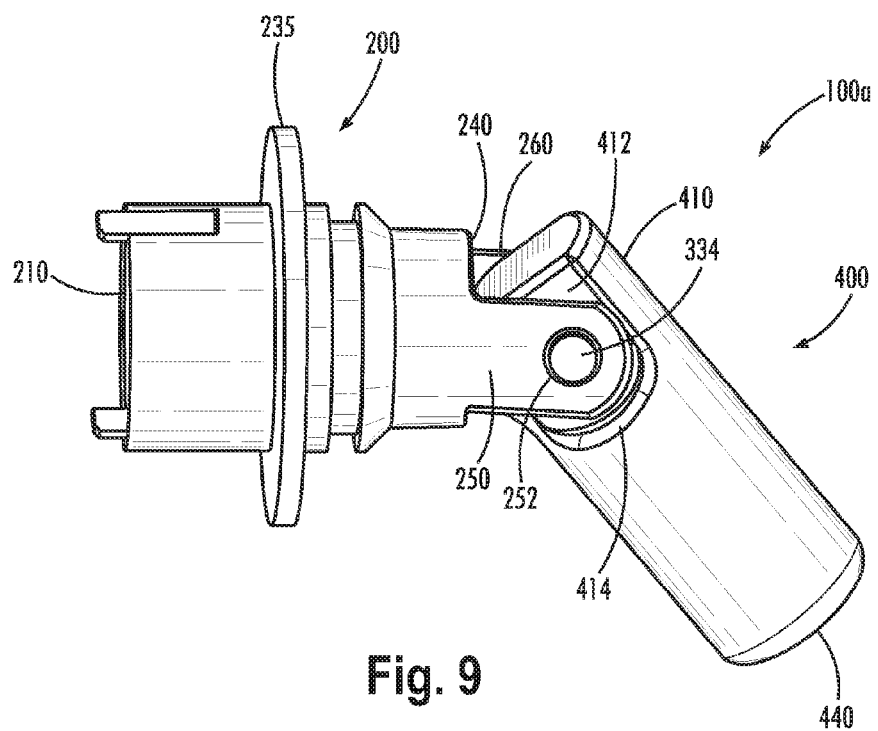
FIG. 9 is a perspective view of the liquid level sensor of FIG. 7 in a low-level position.
Figure 10:
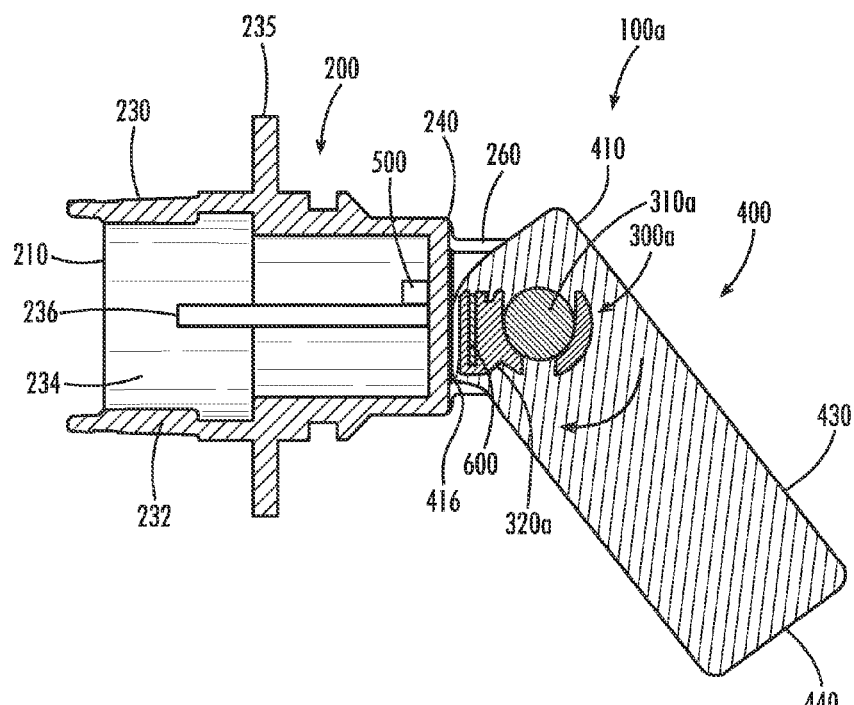
FIG. 10 is a sectional view along a longitudinal axis of the liquid level sensor shown in FIG. 9.

Referring now to FIG. 9, a perspective view of liquid level sensor 100a in a low-level position, i.e., when the level of fluid is below a predetermined level, is shown. As the fluid level drops below the full position, in the absence of fluid exerting upward force against body 430 of float 400, the weight of body 430 will cause float 400 to move to the low-level position, in which body 430 of float 400 is oblique, or declined, with respect to the longitudinal axis of housing 200. As best seen in FIG. 10, first end 410 of float 400 includes a boss 416 that protrudes from first end 410 such that when float 400 and housing 200 are obliquely position relative to each other, as in the low-level position, boss 416 and closed end 240 are in confronting engagement. As well, as best seen in FIG. 14, with boss 416 of first end 410 so positioned with regard to closed end 240, shunt 600 is now interposed between magnet 310a and reed switch 500. As such, the magnetic flux field of magnet 310a is shielded from reed switch 500, causing the reeds of reed switch to move apart, thereby opening the circuit. Boss 416 prevents rotation of float 400 downwardly beyond the low-level position. As such, shunt 600 will maintain reed switch 500 in the proper position until the low-level condition is cured.

As discussed above, for the present embodiment of level sensor 100a, shunt 600 is positioned and dimensioned such that it shields or deflects the magnetic flux of magnet 310a from reed switch 500 when float 400 is in the low level position. As well, for the present embodiment, a center-line to center-line distance between reed switch 500 and shunt 600 is approximately 0.375 inches and a center-line to center-line distance between shunt 600 and magnet 310a is approximately 0.125 inches. Thus, a center-line to center-line distance between reed switch 500 and magnet 310a of this embodiment is approximately 0.500 inches. Other suitable dimensions between reed switch 500, shunt 600, and magnet 310a can be used, dependent upon various factors such as magnet strength, specifications of the reed switch, size of the shunt, etc.

While one or more preferred embodiments of the disclosure have been described above, it should be understood that any and all equivalent realizations of the present disclosure are included within the scope and spirit thereof. The embodiments depicted are presented by way of example only and are not intended as limitations upon the present disclosure. Thus, it should be understood by those of ordinary skill in this art that the present disclosure is not limited to these embodiments as modifications can be made. Therefore, it is contemplated that any and all such embodiments are included and fall within the scope and spirit of the present disclosure.

What is claimed is:

1. A liquid level sensor for use with a container, comprising:
   a housing defining an interior volume, the housing extending through a wall of the container;
   a switch actuated by an applied magnetic flux field, the switch being disposed within the interior volume of the housing so that it is not contacted by fluid within the container;
   a float including a body, a first end and a second end opposite the first end;
   a pivot assembly pivotably coupling the housing and the first end of the float such that the float is pivotable about the pivot assembly between a first position and a second position;
   a magnet disposed within the pivot assembly; and
   a shunt disposed within the first end of the float body, wherein the shunt is disposed between the magnet and the switch in one of the first position and the second position of the float.

2. The liquid level sensor of claim 1, wherein the shunt is disposed between the magnet and the switch in the first position of the float.

3. The liquid level sensor of claim 2, wherein in the first position of the float the shunt shields the switch from the magnetic flux field of the magnet such that the switch is in an open position.

4. The liquid level sensor of claim 1, wherein the switch, the shunt and the magnet all lie along a longitudinal center axis of the housing when the float is in the first position.

5. The liquid level sensor of claim 4, wherein a longitudinal center axis of the float is parallel to the longitudinal center axis of the housing when the float is in the first position.

6. The liquid level sensor of claim 1, wherein the housing further comprises a body having a closed end, a first leg and a second leg, the first leg and the second leg extending outwardly from the closed end and each defining an orifice, wherein the first end of the float further comprises an orifice, and the pivot assembly is received in the orifices of the first leg, the second leg and the float.

7. The liquid level sensor of claim 6, the pivot assembly further comprising a body which encapsulates the magnet.

8. The liquid level sensor of claim 6, wherein the magnet is cylindrically shaped with a longitudinal center axis that is transverse to a longitudinal center axis of the housing.

9. The liquid level sensor of claim 8, wherein the longitudinal center axis of the magnet defines a pivot axis about which the float is pivotable relative to the housing.

10. The liquid level sensor of claim 1, wherein the switch further comprises a reed switch.

11. The liquid level sensor of claim 1, wherein the magnetic flux field is applied to the switch in the second position of the float such that the switch is in the closed position.

* * * * *